United States Patent Office 3,563,638
Patented Feb. 16, 1971

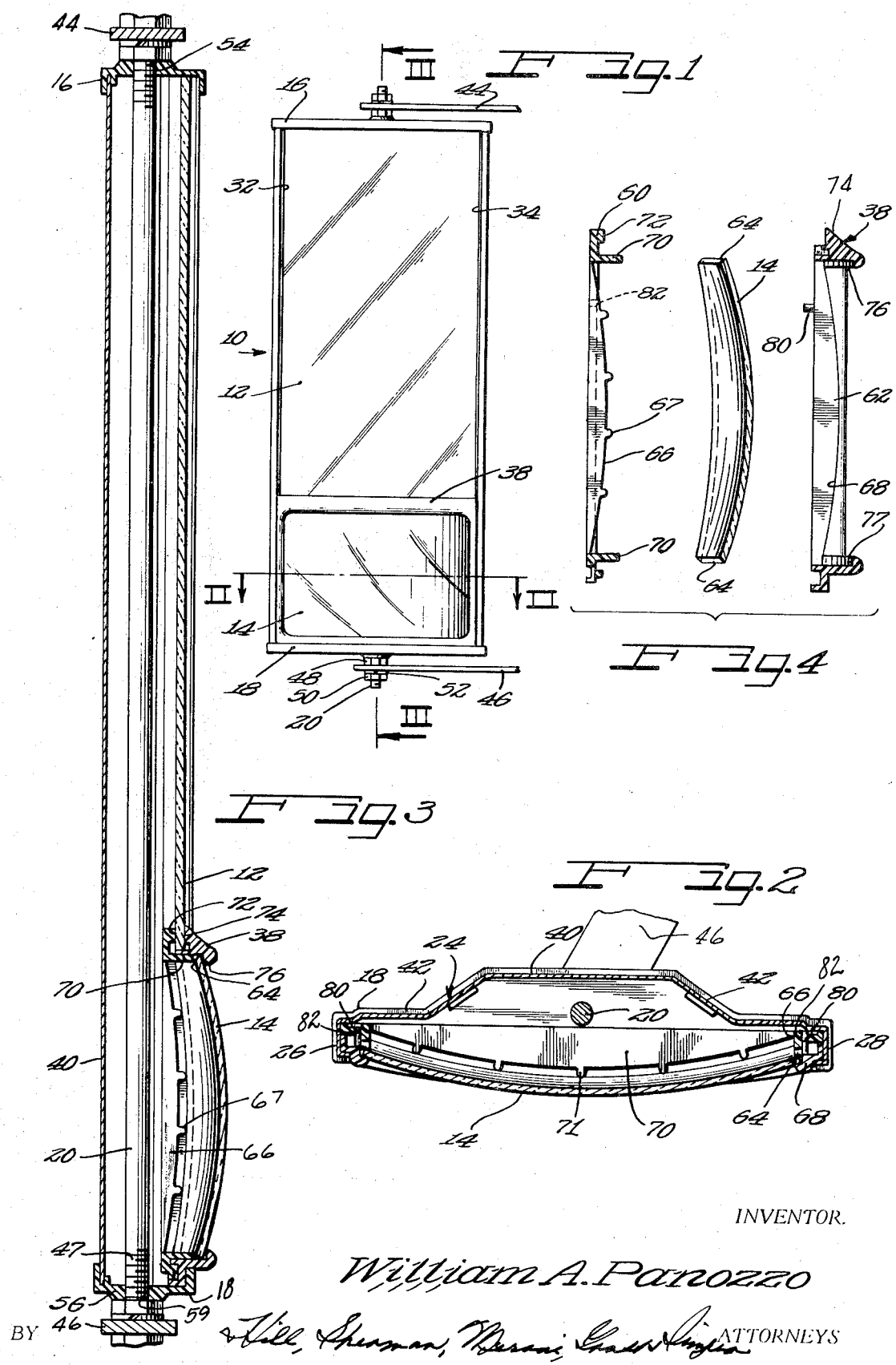

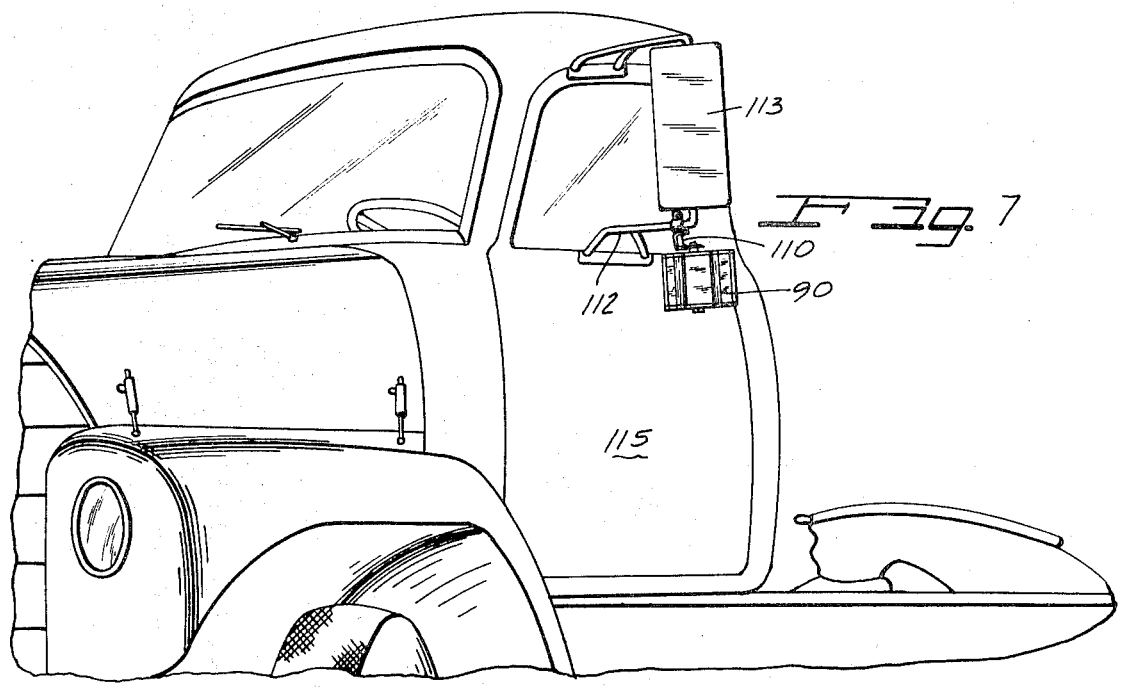
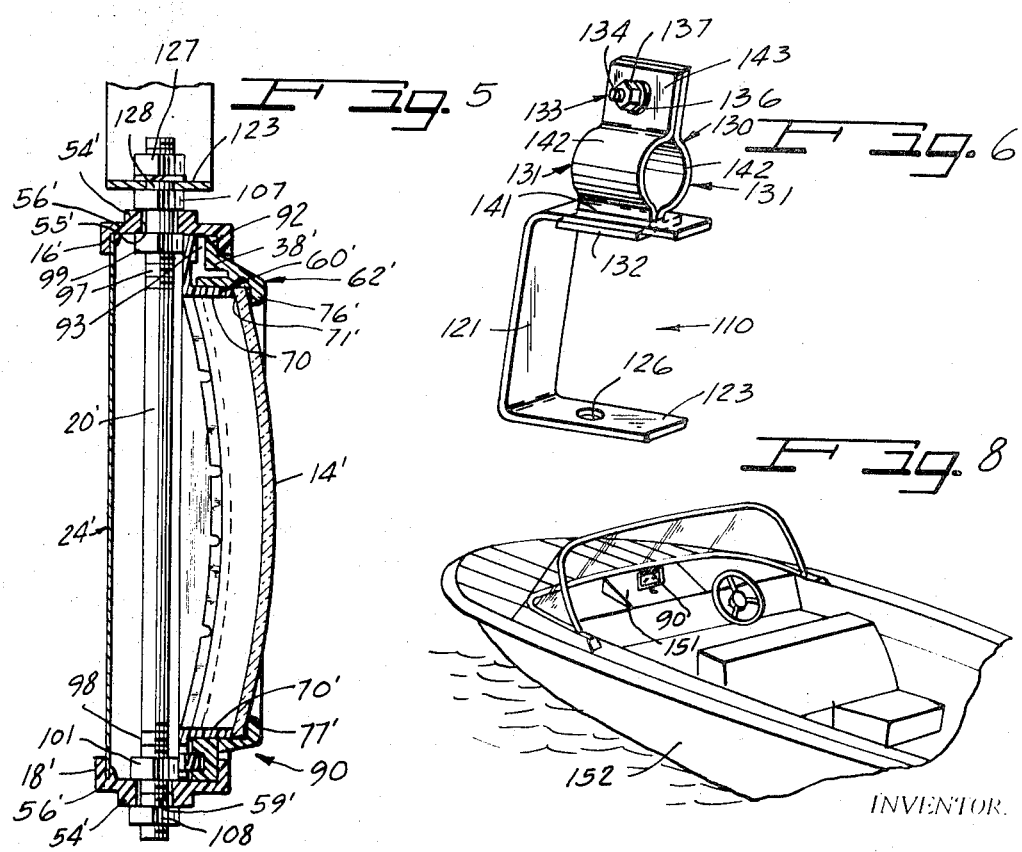

3,563,638
MIRROR ASSEMBLY HAVING A TWO-PIECE MOLDING
William A. Panozzo, Chicago, Ill., assignor to Sure Plus Manufacturing Co., Chicago, Ill., a corporation of Illinois
Filed Aug. 26, 1968, Ser. No. 755,174
Int. Cl. B60r 1/06; G02b 5/10
U.S. Cl. 350—293                                 5 Claims

ABSTRACT OF THE DISCLOSURE

A mirror assembly for a vehicle having a convex mirror, a resilient two-piece molding engaging the edges of the convex mirror surfaces, a housing plate forming a pair of parallel vertical channels adapted to engage the resilient molding, a pair of end caps for the housing plate, and a mounting rod which passes through the end caps to secure the mirror assembly and attach the assembly to a pair of mounting members. A multivision mirror assembly including a convex mirror assembly as hereinabove described in a combination with a planar mirror fitted into a slot provided by the two-piece molding engaging the edges of the convex mirror and a housing having a channel for engaging an upper edge of the planar mirror and opposed longitudinally extending edges thereof to hold the planar mirror in an assembled relationship with the convex mirror.

BACKGROUND OF THE INVENTION

Field of the invention

This invention relates to a mirror assembly and supporting means thereof, and more particularly refers to a convex mirror, either singularly or in combination with a planar mirror, and mounting means therefor particularly adapted to use as a rear vision mirror for vehicles.

Description of the prior art

It is known to use a mirror having a pair of mirrors in vertically spaced orientation for mounting on a vehicle. It is also known to secure the same to a vehicle or the like as a rear vision assembly by means of mounting brackets. Previous mirror mountings have not provided members which may be utilized in both a unitary convex mirror and a combination convex-planar mirror.

SUMMARY

In accordance with the present invention, I have provided a mirror assembly including a convex mirror, a resilient two-piece molding for the edge of the convex mirror, a housing plate having a pair of spaced parallel channels to engage the resilient molding, a pair of end caps to engage the housing plate, and a mounting rod which passes through the end caps to secure the assembly and form an attachment for a vehicle or the like.

It is also contemplated by the present invention, that a convex mirror assembly as hereinabove described, be combined with a planar mirror to provide a multivision mirror assembly adapted for use with a vehicle. In this embodiment of the invention, the resilient two-piece molding for the edges of the convex mirror provides an upwardly opening slot for receiving a lower edge of the planar mirror. Also, the housing plate is extended upwardly to provide a pair of spaced parallel channels for engaging a resilient molding which grips longitudinally extending edges of the planar mirror.

It should be noted, that the two-piece molding encircling the edges of the convex mirror desirably is formed with a configuration to permit using the same molding for both the unitary convex mirror assembly and for the combination planar-convex mirror. To accomplish this desirable objective, the present invention provides a resilient molding for encircling the edges of the convex mirror which is formed with an upwardly extending slot for engaging and gripping the lower edge of the planar mirror while also having a configuration for permitting the upwardly opening slot to be closed by end cap in the unitary convex mirror assembly.

Accordingly, it is a primary objective of the present invention to provide a two-piece resilient molding for encircling and gripping the edges of a convex mirror, wherein the same molding may be utilized both in a combination planar convex mirror and in a unitary convex mirror.

It is a further object of the present invention to provide a multivision mirror assembly for a vehicle.

Another object of the present invention is to provide a method of making a resilient molding for a convex mirror.

Yet another object of the present invention is to provide a method for making a multivision mirror which is economical and utilizes a minimum number of steps.

Still a further object of the present invention is to provide a mirror protected by a two-piece, resilient molding at all contact edges.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a front plan view of a mirror embodying the features of the present invention;

FIG. 2 is an enlarged sectional view taken along the line II—II of FIG. 1;

FIG. 3 is an enlarged sectional view taken along the line III—III of FIG. 1;

FIG. 4 is an exploded sectional view of the convex mirror and molding;

FIG. 5 is a sectional view similar to FIG. 3 showing an alternative embodiment of the present invention;

FIG. 6 is a perspective view illustrating a bracket for mounting the mirror assembly shown in FIG. 5 on a standard truck mirror;

FIG. 7 is a perspective view illustrating the mirror shown in FIG. 5 mounted in combination with a standard truck mirror; and FIG. 8 is a perspective view illustrating the alternative embodiment of the present invention employed as a rear vision mirror for a boat.

DETAILED DESCRIPTION OF THE PREFERRED EMBODIMENTS

The principles of this invention are particularly useful when embodied in a mirror as illustrated in FIG. 1, generally indicated by the numeral 10. The mirror 10 is rectangular and has a planar mirror 12 vertically spaced above a convex mirror 14.

The mirror 10 is secured by a pair of end caps 16, 18 disposed at the short ends of the rectangle and secured to the mirror 10 by a mounting rod 20. The mirror 10 is enclosed by a housing plate 24 having a pair of 90° bends along each side of the long dimension of the rectangle forming spaced parallel channels 26, 28.

The planar mirror 12 is engaged by a pair of resilient molding strips 32, 34 having a U-shaped cross section which are disposed in the channels 26, 28 respectively.

The mirror 12 is spaced above the convex mirror 14 and separated therefrom by a horizontal molding segment 38.

The housing plate 24 has a central web portion 40 extending the length of the long axis of the rectangle substantially parallel to the planar mirror 12 and the mounting rod 20. The web portion 40 is joined to the channels 26, 28 by an angled web portion 42. The mounting rod 20 is adapted to be engaged by a pair of mounting brackets 44, 46 from a vehicle or the like. The mounting rod 20 has threaded end portions 47 at either end thereof which engage a pair of nuts 48, 50 and a lock washer 52. The inner nuts 48 engage raised portions 54 and 56 surrounding apertures 55 and 59 provided respectively in the end caps 16 and 18.

The convex mirror 14 is secured in the mirror 10 in a resilient two-piece molding or bezel having inner and outer members 60, 62 respectively.

The inner member 60 has a pair of complementary convex, vertical surfaces 66 with beads 67 adapted to engage the inner surface of the convex mirror 14 at a series of points to provide additional resiliency. The outer member 62 has a corresponding complementary outer radial segment 68 adapted to engage the outer surface of the convex mirror 14 within the channels 26, 28. The inner member 60 has a pair of complementary convex horizontal segments 70 which engage the edges 64 of the mirror 14.

There is a projection 72 at the upper end of the inner member 60. The projection 72 cooperates with a corresponding raised portion 74 on the horizontal molding 38 to engage the planar mirror 12 horizontally above the convex mirror 14, FIG. 3. The projections 70 cooperate with confronting ribs 76 and 77 formed on the outer resilient member 62 to grip the edges 64 of the convex mirror therebetween. The projections 70 are formed with an arcuate outer edge conforming to the curvature of the convex mirror 14 and have raised portions or beads 71 which form a series of contact points with the inner mirror surface. A pair of studs 80 are provided on the outer molding 62 and are inserted into guide apertures 82 of the inner molding 60 to assure proper alignment of the two molding members 60 and 62.

The mirror assembly 10 is made of a noncorrosive metal, preferably a chromed metal or aluminum with chromed end nuts at the ends of the threaded portions 47 of the mounting rod 20. The resilient molding 32, 34, 60 and 62 is preferably made of plastic.

Plastic, including a portion of carbon black, has been found to form a preferred resilient molding as its inert chemical nature prevents discoloration of the moldings and permanent clouding of the mirror. Furthermore, the molding is not stressed, thereby providing an assembly which avoids deterioration of the molding material.

The housing for the multivision mirror 10 may be mounted to the supporting structure by means of a ball stud attached centrally to the web plate 40.

In making a mirror housing for the curved mirror 14, the inner molding 60 is placed adjacent the rear of the mirror with the beads 67 and 71 in contact with the inner mirror surface at the mirror edges 64. The outer molding member 62 is then joined to the inner molding member 60 with the studs 80 inserted into the apertures 82 and with the mirror 14 gripped between the moldings. The moldings 60 and 62 including the secured mirror 14 is then slidably inserted into the housing channels 26 and 28 in a manner to maintain the molding 60 and 62 and the mirror 14 in an assembled relationship. Also, the planar mirror 14, gripped within moldings 32 and 34, is secured within the same channels 26 and 28 as the convex mirror 14 in a manner similar to that described hereinabove for mirror 14. The housing is then completed by the pair of end caps 16 and 18 which are bolted to the housing by the rod 20.

The end caps 16 and 18 close the open ends of the channels 26 and 28 of the housing plate 24 and are held in engagement with the housing by the rod 20 and bolts 48 to prevent the moldings 32, 34, 60 and 62 from longitudinally sliding, thereby securely maintaining the various components of the assembly in an assembled relationship.

It may be desirable to incorporate the features of the present invention in an alternative embodiment including a unitary convex mirror as illustrated in FIG. 5. It should be appreciated, that a unitary convex mirror embodying the features of the present invention may be utilized alone as a rear vision mirror for a vehicle or as a wide angle mirror wherever such a mirror is desired. Also, a unitary convex mirror, as illustrated in FIG. 5, may be combined with a standard planar vehicle rear vision mirror as illustrated in FIG. 7. When a unitary convex mirror embodying the features of the present invention is utilized in conjunction with an existing planar mirror of a vehicle, the desired combination of a planar mirror and a convex mirror is achieved without the necessity of replacing the existing mirror with a multivision or combination mirror as illustrated in FIGS. 1–4. Therefore, this alternative embodiment of the present invention provides a means by which a multivision mirror may be provided without the additional expense of replacing an existing planar mirror.

In accordance with this alternative embodiment of the present invention, a unitary convex mirror generally designated as 90 includes a housing plate 24' providing a pair of spaced, opposed channels for receiving a pair of resilient moldings 60' and 62'. A convex mirror 14' is gripped between horizontal segments 70' formed on an inner resilient molding 60' and rib portions 76' and 77' formed on an outer resilient member 62'. As described hereinabove, the horizontal segments 70' have an arcuate-shaped outer edge conforming to the curvature of the convex mirror 14' and include outwardly projecting beads 71'. The beads 71' provide a series of contact points with the inner surface of the convex mirror 14'. It should be appreciated, that manufacturing tolerances do not permit a perfect match between the curvature of the horizontal segments 70' and the inner surface of the convex mirror 14'. Thus, the beads 71' are provided to form a series of contact points with the inner surface of the mirror 14', and the resiliency of the inner member 60' permits flexing thereof to allow the beads 71' to move into engagement with the mirror 14', thereby to allow for variations between the curvature of the outer edge of the horizontal segments 70' and the curvature of the mirror 14'.

In a similar manner, the vertically extending edges of the mirror 14' are gripped between vertically extending ribs 66' of the inner member 60' and confronting shoulder portions 68' of the outer member 62'. The vertically extending segments 66' formed on opposed edges of the inner member 60' have an arcuate-shaped configuration approximately conforming to the curvature of the vertically extending edges of the convex mirror 14' and are provided with beads 67' forming contact points with the convex mirror. The confronting shoulder portions 68' of the outer member 62' also are provided with an arcuate-shaped configuration conforming to the curvature of the vertically extending edges of the mirror 14'.

It should be noted, that the upper, horizontally extending segment 38' of the outer resilient molding member 62' is formed with an outwardly facing inclined surface 92 in a manner similar to that of the molding of the first embodiment of the present invention. Also, the molding members 60' and 62' of this alternative embodiment of the present invention cooperate to form a slot 93 which may receive a planar mirror such as 12. Thus, it should be apparent, that the molding members 60' and 62' are identical in all respects to the molding members 60 and 62 of the first embodiment of the present invention. Therefore, one of the features of the present invention is to provide a pair of molding members such as 60' and 62' or 60 and 62 which are formed to grip a convex mirror such as 14' or 14 therebetween and which are adapted to be included in both a combination mirror having a planar mirror such as 12 disposed within the slot 93 provided by the resilient molding member and in a unitary convex mirror independent of a planar mirror.

The unitary convex mirror 90 of this alternative embodiment of the present invention is assembled in a manner similar to that of the first embodiment hereof, namely, by sliding the molding members 60' and 62' having the mirror 14' gripped therebetween into the channels formed by the housing plate 24' and the attaching end caps 16' and 18' over the open ends of the housing to restrain the molding members and the convex mirror against longitudinal movement. The end caps 16' and 18' are held into engagement with the housing plate 24' by means of a longitudinally disposed stud 20' having opposed end portions thereof threaded as at 97 and 98. A pair of nuts 99 and 101 are threaded onto the stud 20' and are arranged to engage interior surfaces of the end caps 16' and 18' for maintaining the same in their proper vertical spacing.

The rod 20' passes through apertures 55' and 59' formed respectively through the end caps 16' and 18', and nuts 107 and 108 are threaded onto the rod and engage embossments 54' and 56', respectively, of the end caps 16' and 18'. The end cap 16' is gripped between the nuts 108 and 101.

It has been found desirable to provide a mounting bracket such as 110 for attaching the unitary convex mirror 90 to a horizontally extending post member such as 112 of a standard bracket utilized for mounting a standard mirror such as 113 to a vehicle designated as 115. The mounting bracket 110 includes a substantially C-shaped member 121 providing a lower, horizontally extending segment 123 onto which the mirror 90 is attached. The horizontally extending segment 123 has an aperture 126 formed therethrough for receiving an upper end portion of the rod 20'. To maintain the mirror 90 in engagement with the horizontal segment 123', and attachment nut 127 is threaded over the upper end portion of the rod with a lock washer 128 disposed between the nut and an upper surface of the horizontal segment 123. The nut 127 is threaded onto the rod 20' sufficient distance to clamp the horizontal segment 123 between the lock washer 128 and the nut 107, thereby securing the unitary convex mirror 90 to the attachment bracket 110.

A clamping device generally designated as 130 is provided for attaching the member 121 and the associated mirror 90 to the horizontally extending post 112 of the bracket supporting the standard mirror 113. The clamping device includes a pair of identical, but reversely arranged, members 131, 131. Each clamp member 131 includes an outwardly extending portion 132, a medial portion 142 having an arcuate cross section and an upper planar section 143 having an aperture therethrough for receiving an adjustable clamping fastener 133 including a bolt 134, lock washers 136 and an attachment nut 137. An upper horizontal segment 139 of the C-shaped member 121 is provided with an elongated slot 141 for receiving a lower portion 140 of the clamping member 131 therein with the horizontally, outwardly extending segments 132 engaging an underneath surface of the upper horizontal segment 139. The horizontally extending segments 132 of the clamping members 131 are arranged to extend in opposite directions for providing a wide area of support for the attachment member 121. The arcuate-shaped medial portions 142 of the clamping members 131 are arranged to provide a pair of opposed, particylindrical surfaces for encircling the post 112 and for clamping the post therebetween. With the medial portions 142 encircling the post 112, the bolt 134 is inserted through the apertures provided therefor in the upper planar portions 143 of the clamping members 131 and the nut 137 and lock washers 136 are fitted onto the bolt 134 a sufficient distance to securely clamp the attachment member 121 to the post 112, thereby to attach the unitary convex mirror 90 to the post 112.

With the unitary convex mirror 90 clamped to the post 112 of the standard bracket for the mirror 113, a multivision, combination mirror is provided without the necessity of replacing the existing mirror 113, which may be of a planar configuration.

It has also been found to be desirable to utilize a convex mirror such as 90 independent of any other mirror, either convex or planar. As illustrated in FIG. 8, the unitary convex mirror 90 may be used as a rear vision mirror for a powered boat, the mirror 90 may be mounted on a boat dashboard such as 151.

It is contemplated by the present invention, that mounting of the mirror 90 onto the dashboard 151 of the boat 152 may be accomplished by extending the lower, threaded end portion of the rod 20' to provide a threaded portion for receiving mounting bolts. The extended lower end portion of the rod 20 may be fitted through an appropriately formed aperture in the dashboard 151, and threaded nuts and lock washers may be utilized to secure the rod 20' to the dashboard in a known manner.

Although minor modifications might be suggested by those versed in the art, it should be understood that I wish to embody within the scope of the patent warranted hereon all such embodiments as reasonably and properly come within the scope of my contribution to the art.

I claim as my invention:

1. A rearview mirror comprising:
   a housing having a backwall portion and a pair of inwardly facing, opposed, parallel channels formed at opposite side edge portions of said backwall portion;
   a rectangular convex mirror;
   means forming a rectangular molding engaging peripheral edge portions of said mirror and including
      a first resilient, rectangular member disposed adjacent one face surface of said mirror and having rectangularly arranged rib portions projecting toward said one face surface of said mirror at the peripheral edge portions thereof,
      each said rib portion having an end adjacent to and confronting said mirror face surface and formed with an arcuate configuration complemental to the curvature of said mirror peripheral edge portions,
   a second resilient, rectangular members having rectangularly arranged wall portions engaging side edges of said mirror and inwardly projecting portions formed on said sidewalls and engaging the other face surface of said mirror and formed to cooperate with said ribs for clamping said mirror between said members,
      a pair of oppositely projecting, parallel surfaces respectively formed on said first member and said second member at each opposite side edge portion thereof and spaced apart a distance to be fittingly received within said opposed, parallel channels, thereby to positively clamp said mirror between said members and to maintain said housing, said mirror and said members in assembled relationship.

2. A rearview mirror as defined in claim 1 and further characterized by:
   said rib portions having a plurality of spaced projections formed thereon, extending toward and engaging said one face surface of said mirror to provide a plurality of support points along said peripheral edge portions of said mirror.

3. A rearview mirror as defined in claim 1 and further characterized by:
   said first member being disposed between said housing backwall portion and a rear surface of said mirror with said rib portions extending outwardly of said backwall portion; and said second member formed with said inwardly projecting portions engaging a front face surface of said mirror.

4. A rearview mirror as defined in claim 1 and further characterized by:
means formed on said first member and said second member and cooperating to form a slot extending laterally between said pair of opposed channels for receiving an end edge portion of a planar mirror having side edge portions received within said channels; and
means forming a pair of end caps closing opposite open ends of said channels, one said end cap being disposed adjacent an end edge portion of said planar mirror opposite of the edge portion retained within said slot, and the other said end cap being disposed adjacent an end of said molding members.

5. A rearview mirror as defined in claim 2 and further characterized by:
said second member having rectangularly arranged, inwardly projecting surfaces formed on said wall portions and engaging said mirror side edges and cooperating with said inwardly extending portions to form a peripherally extending recess for receiving said mirror in nestled relationship therewith; and
said rectangularly arranged ribs having planar, outwardly projecting surfaces disposed to confront and engage said inwardly projecting surfaces formed on said second member for maintaining said members in proper registry.

References Cited
UNITED STATES PATENTS

| | | | |
|---|---|---|---|
| 3,170,985 | 2/1965 | Katulich | 350—293 |
| 3,375,053 | 3/1968 | Ward | 350—293 |
| 3,408,136 | 10/1968 | Travis | 350—293 |
| 3,448,553 | 6/1969 | Herr et al. | 350—288X |

J. W. LEONARD, Assistant Examiner

DAVID SCHONBERG, Primary Examiner

U.S. Cl. X.R.

248—479